United States Patent [19]

Wostl et al.

[11] 4,199,100
[45] Apr. 22, 1980

[54] CREDIT CARD AUTOMATED SYSTEM FOR VEHICLE SERVICE STATIONS

[75] Inventors: Wolfgang J. Wostl, South Holland; Jack S. Segal, Park Forest, both of Ill.; Thomas L. Roach, Dyer, Ind.; Robert A. Moore, Park Forest, Ill.

[73] Assignee: Atlantic Richfield Company, Philadelphia, Pa.

[21] Appl. No.: 913,917

[22] Filed: Jun. 8, 1978

[51] Int. Cl.² ............................ G07F 7/08; H04Q 1/30
[52] U.S. Cl. .................................... 235/381; 340/147A
[58] Field of Search .......... 340/147 A, 149 A, 152 R; 222/2, 30; 235/92 CT, 381, 380, 382, 383

[56] References Cited

U.S. PATENT DOCUMENTS

| 3,632,988 | 1/1972 | Yamawaki | 235/381 |
| 3,644,713 | 2/1972 | Hayakawa | 200/46 |
| 3,786,421 | 1/1974 | Wostl | 340/147 A |
| 3,873,019 | 3/1975 | Holcomb | 235/92 CT |
| 3,913,069 | 10/1975 | Rundin | 340/147 A |
| 4,072,929 | 2/1978 | Garmong | 340/147 A |
| 4,135,149 | 1/1979 | Takahashi | 340/147 A |

Primary Examiner—Robert M. Kilgore

[57] ABSTRACT

An attendant-controlled terminal, operating under the control of a conventional microprocessor, monitors and controls remote fuel pumping units, combines fuel sale information with information concerning additional sales keyboarded by the attendant, accepts customer account information recorded on a credit card, verifies that the identified account is in good standing, and prints a credit card receipt for signature by the customer, the receipt being printed in an optically-readable format compatible with conventional automated invoice processing equipment.

20 Claims, 14 Drawing Figures

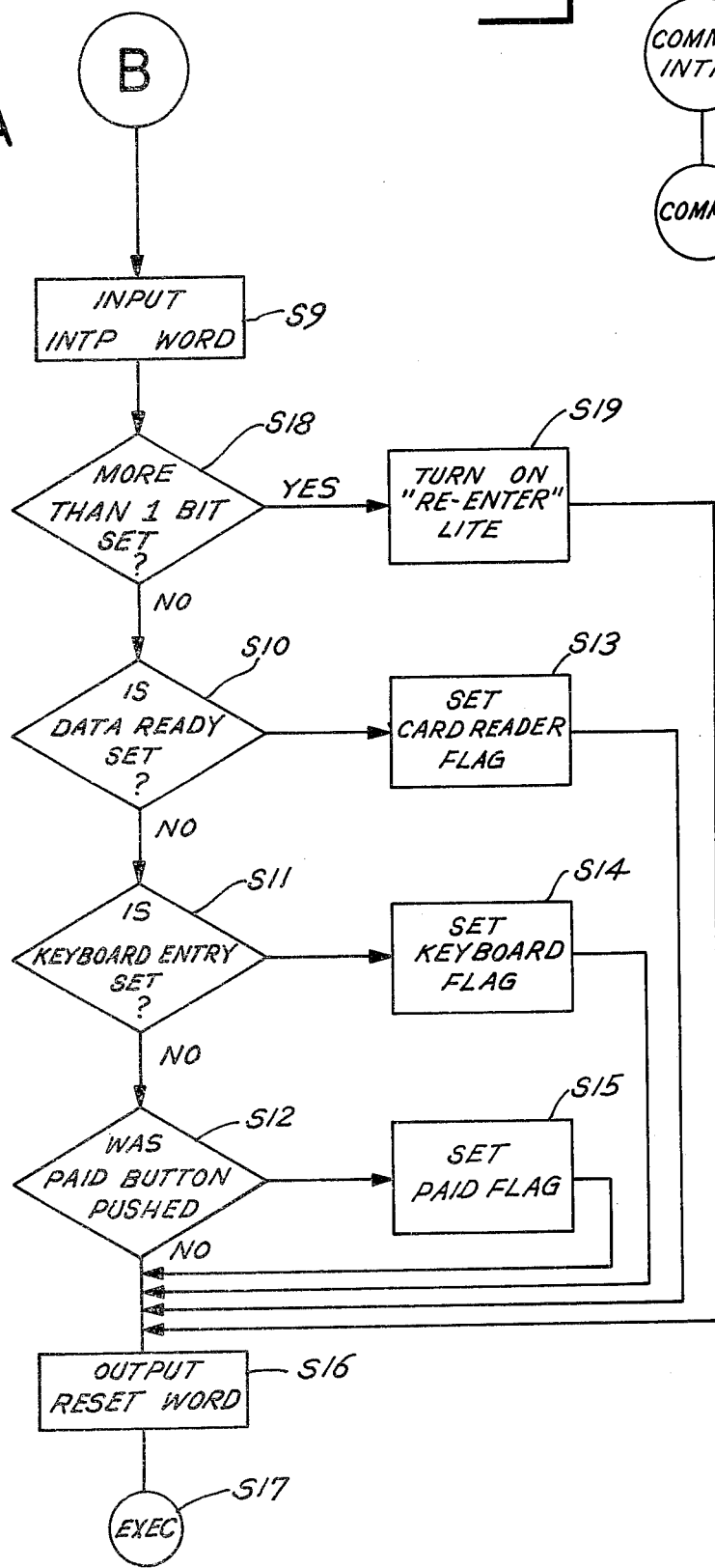
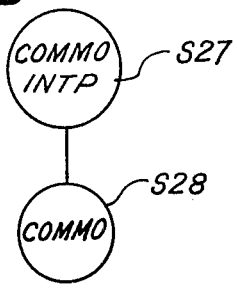
Fig. 5A
Fig. 5B

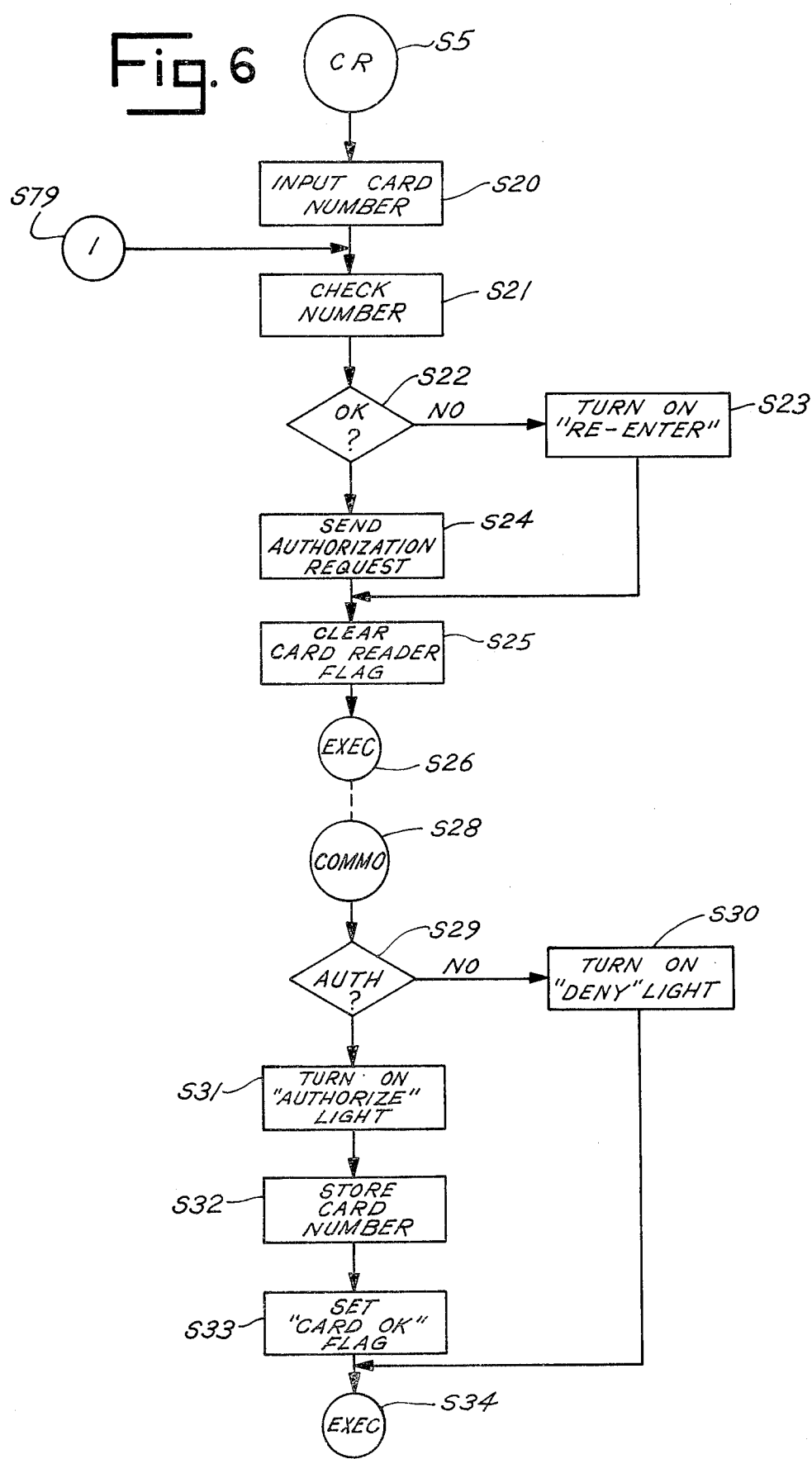

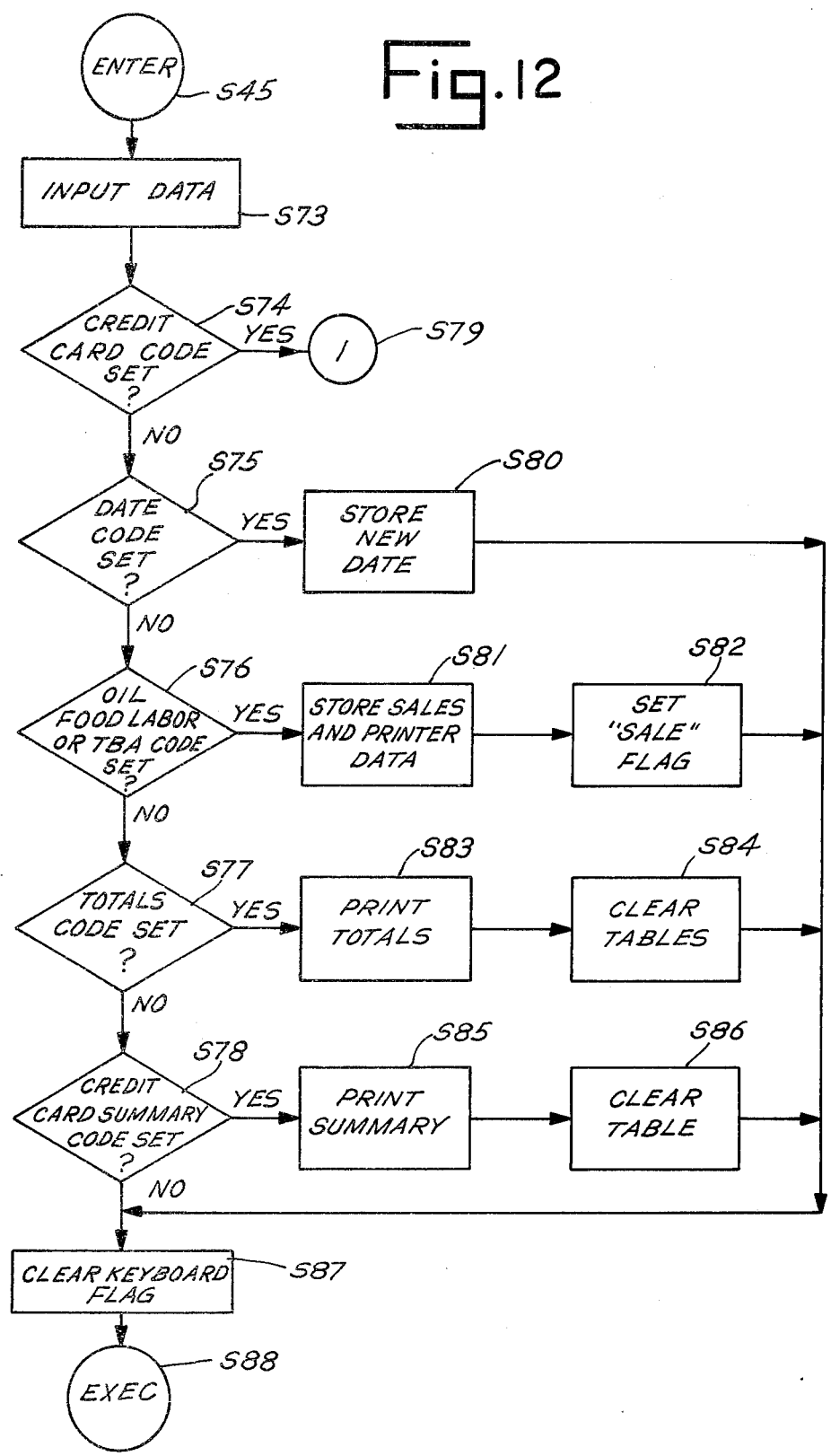

CREDIT CARD AUTOMATED SYSTEM FOR VEHICLE SERVICE STATIONS

BACKGROUND OF THE INVENTION

The present invention relates to an attendant-controlled terminal for automatic enablement and monitoring of fuel dispensers, and more particularly relates to a cash/credit sales control terminal for use in a gasoline service station, which monitors and controls the amount of dispensed fuel from a plurality of gasoline pumps, combines miscellaneous sales information to the sale amount of a selected one of the pumps, prints individual customer receipts, automatically verifies a customer's credit status, and provides certain accounting and inventory functions.

Heretofore, equipment has been provided in service stations which permits the remote display of gasoline transactional information, i.e., the display of the dollar amount and gallonage of a pump transaction on a display console which may be located in the sales office of the service station, outside the view of the pump dispenser.

To utilize this information, however, the attendant must manually transcribe the displayed information onto a receipt/invoice for presentation to the customer. For credit transactions, the attendant must manually transfer the account number from the customer's embossed credit card onto the receipt, normally by means of a hand-operated embossing machine, and transcribe on the receipt the appropriate sales information. Verification of the customer's credit is often done manually via a printed "bad accounts" booklet, telephonically or electronically via a connection to a dedicated, on-line credit authorization network.

All of these manual operations are time-consuming to the attendant. With the recent trend toward single attendant operated, self-service stations, one of the problems which arises is that customers are kept waiting in line to pay the single attendant while the attendant transacts business with previous customers. This time consumption problem is further exacerbated, where the customer desires to purchase miscellaneous items in addition to his gasoline purchase, espceially when such purchases are by credit card.

The attendant's transactional operations are not only time-consuming, they are subject to error, illegibility and fraud. The attendant must have intelligence and training to transact business quickly with the customer so that customers are not kept waiting.

The prior art discloses a fully automated vending-type apparatus for the dispensement of fuel, described in U.S. Pat. No. 3,786,421 issued to W. Wostl on Jan. 15, 1974. The Wostl device provides a step forward in the art, eliminating the service station attendant altogether by permitting self-vending of the fuel and self-payment by the customer.

Wostl provides an automated service station having a control console into which a customer inserts his credit card. Identifying indicia on the credit card are read, and signals indicative of those identifying indicia are transmitted to a data bank in which is stored credit information on holders of credit cards. If the credit card is approved, the data bank returns an approval signal permitting the control console to receive from the customer an indication of the fuel or other goods which he desires to obtain. The control console enables the dispensing device for the selected goods, and the customer then actuates the dispensing device himself to obtain the goods.

The Wostl device, however, it not capable of handling the sales of goods which cannot be automatically dispensed, and, therefore, does not create a transactional receipt for such goods. Nor is the Wostl device compatible with conventional credit card processing in which credit card indicia is printed onto a receipt in a form recognizable by an optical reading device. The optical reading device is used to scan the transactional receipt in order to retrieve customer information and sales data for appropriately billing the customer.

SUMMARY OF THE INVENTION

It is therefore an object of this invention to automate credit card transactions in a vehicle service station in order to speed up sale transactions and reduce the liklihood of error and fraud by the attendant on duty.

The invention is a terminal apparatus which monitors at least one, and preferably, a plurality of, fuel dispensers for selective retrieval of fuel sales information to be automatically combined with miscellaneous sales information in the form of a printed receipt, by a simple command from the attendant. A credit card reader obtains credit card information for performing an analysis of the credit status of the card via a data bank. A keyboard provides a means for the attendant to enter miscellaneous sales information and to command a performance of selected functions. A receipt printer prints a credit card receipt whenever the customer's credit status is positive, sales information has occurred and the attendant has requested the receipt printout.

In accordance with a further feature of the invention, the terminal records predetermined information for providing an accounting print-out when requested by the terminal operator. A display device may be connected to the terminal for providing visual output to the operator of formulated information, as for example, the customer's credit status.

Other objects, features and advantages of the invention will be readily apparent from the following description of the preferred embodiment taken in conjunction with the appended claims, and accompanying drawings.

BRIEF DESCRIPTION OF THE DRAWINGS

FIGS. 5A and 5B are flowcharts illustrating the flow of interrupts executed by the microcomputer of FIG. 3.

FIG. 6 is a flowchart of credit card account data and status data acquisition executed by the microcomputer of FIG. 3.

FIGS. 10–13 are flowcharts of control keyboard commands executed by the microcomputer of FIG. 3.

DESCRIPTION OF THE PREFERRED EMBODIMENT

Figure 1:
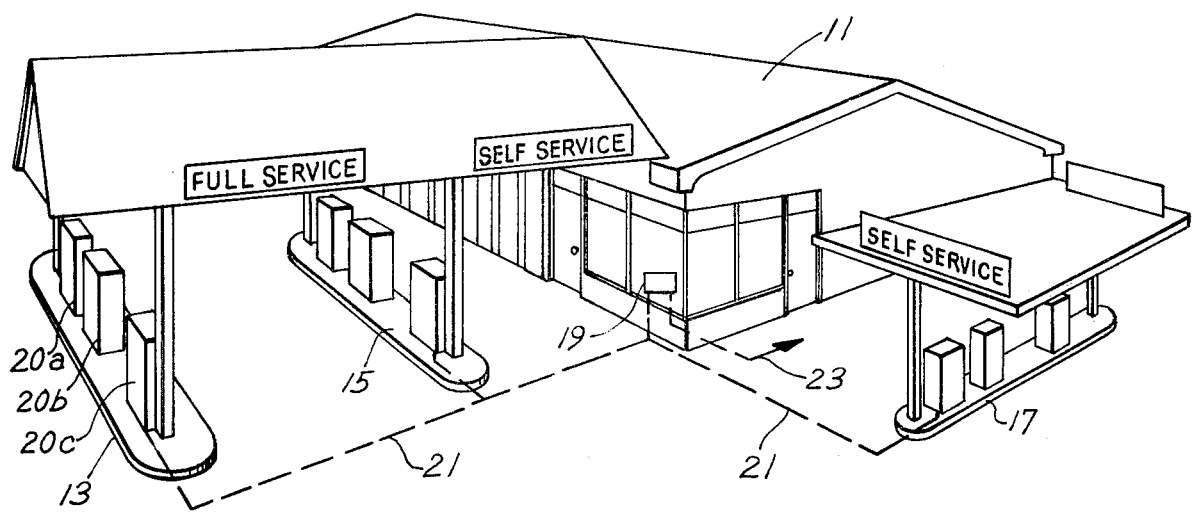
FIG. 1 is a perspective view of a gasoline service station incorporating the system of the present invention.

Referring to FIG. 1, a gasoline station 11 is illustrated having a plurality of gasoline dispensing islands, 13, 15, 17. Each island is shown having three separate gasoline dispensers 20a, 20b, 20c, each of which may have one or two fuel outlets, for dispensing separate types of fuels, as for example, regular, high octane, low-lead and no-lead gasoline. The dispensing islands of the station also may be denominated according to different types of services performed at the islands. For example, at the full service island 13 a station attendant pumps gas, cleans windshields, checks oil and provides other services, while at the self-service island 15 the customer does the pumping himself providing his own service. Such separate service islands may be priced differently for gasoline sales to discount the price of gas where an attendant is not required.

Apparatus of the present invention includes an attendant-controlled console 19, positioned within gas station 11, and includes an underground cable 21 providing communication between console 19 and each of the nine pumps of FIG. 1. A second cable 23 connects console 19 to a data bank (not shown) for transmission and receipt of credit and/or sales information.

Figure 2:
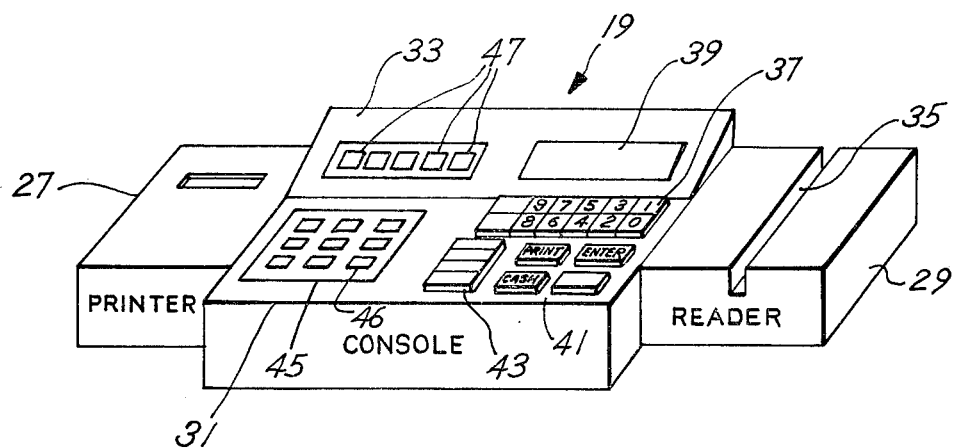
FIG. 2 is a perspective view of a terminal of the system of FIG. 1.

Console 19 is shown in more detail in FIG. 2 as including a receipt printer 27, a credit card reader 29, keyboard 31 and a visual display device 33. Console 19 is controlled by the attendant on duty who may take cash or credit cards for payment of gasoline dispensed from the pumps. Miscellaneous items sold at the gas station, as for example, motor oil, food, automotive components and labor, and the like, can be keyed into console 19 using keyboard 31 to provide proper sale information to ready the console for an automatic printing by printer 27 of both gasoline and miscellaneous item purchases onto a receipt when commended by the attendant.

Credit card reader 29 includes a card receiving guide slot 35 adapted to receive the customer's credit card in a sliding fashion, facilitating quick operation by the attendant to check the card's credit status. Reading heads (not shown) positioned along the insides of the guide slot generate information carried by the card as the card travels quickly therethrough. The card reader 29 retrieves the information from the card for commanding automatic investigation by the console of the credit status of the particular credit card being read. An example of such a card reader 29 is produced by American Magnetics Corporation as Magstripe Reader Model 40.

Keyboard 31 includes a ten-key numeric keypad 37 for entering of numeric information. As numeric keys are pressed a corresponding numeric representation visually appears on a keyboard display 39 of display device 33, for aiding the attendant to enter correct numerical data into the console. Non-gasoline sales data can be entered via numeric keypad 37, as can the user's credit card number in the event that card reader 29 is malfunctioning. Alternately, such non-gasoline sales data may be entered via miscellaneous function keys 43. Numeric control instructions can also be entered from the keypad 37 for controlling the functioning of console 19, as described hereinafter.

A functional keypad 41 is also provided on the keyboard for instructing console 19 to perform particular operating functions by a simple pressing of the keys of keypad 41. For example, a PRINT function key can be actuated for signalling that a proper means of payment has been received and a receipt should be printed from printer 27. A CASH key can be actuated indicating that the particular type of payment being made by the customer is cash rather than credit card. An ENTER and CLEAR functional key may also be included; the ENTER key for entering the information typed from keypad 37 as represented on keyboard display 39, and the CLEAR key for erasing the same typed information in order to retype the numeric values in the event the attendant realizes he has made an error.

Other miscellaneous function keys 43 may be provided on keyboard 31 for simple attendant actuation to command console 19 to perform an operating function. For example, an accounting function may be requested for instructing a printing of accounting totals.

A dispenser control keypad 45 having a plurality of fuel pump selection buttons 46, each button 46 associated with a separate gasoline pump, is provided for permitting the attendant to selectively control the sale of gasoline from individual dispensing pumps at the separate islands. A pump may function for holding the last sale in its display register and inhibiting dispensement of more gasoline until the pump is reset. The actuation of a selection button 46 causes the console 19 to make ready for printing a receipt for the sale of gasoline from the pump associated with the button 46 selected and the pump is then reset for gasoline dispensement by the next customer.

Printer 27 may take the form of a conventional dot matrix printer of the alphanumeric variety and is controllable for providing a number of print functions commanded by the attendant. Ordinarily, printer 27 prints individual customer receipts. Where payment is made by way of credit card, printer 27 is operable to print on preformed, preprinted credit invoices having a plurality of sheets for formulating at least a customer copy and a charge copy. The credit invoice is printed to contain the particular credit card number of the customer and the total sale amount. Further printing may include other particulars, as for example, station identification indicia, the data, the quantity of goods or services purchased, the unit price and the type of product. An example of such a printer 27 is a LRC 7040 Series Matrix Printer manufactured by LRC Inc. Riverton, Wyoming.

In order to permit an optical character recognition system (OCR system) to read the particular charge slip for formulating a monthly billing to the customer, the printer prints the customer's credit card number and total charge amount in OCR readable characters at a proper-well-defined position on the card receipt. OCR readable characters are specifically signed characters which are capable of being read by a machine. This permits all charge copies to be shipped to a central processing station in order for an OCR system to read all charge copies and automatically perform appropriate billing to individual customers.

Printer 27 is also operable for printing out specific accounting information which has been accumulated throughout the day, week, month or particular time period as established by the owner of the station. For example, printer 27 may be commanded to print out credit card summaries of the account numbers and accumulated number of credit dollars which have been utilized by purchases throughout a given time period. This credit summary can in turn be used as credit to purchase bulk fuel from the petroleum company's tank trucks. Also, printer 27 is capable of printing out accumulated sales totals or gallonage totals for particular days, weeks or 8-hour shifts if so desired.

Visual display device 33 includes a plurality of annunciators 47 which are controllable for communicatng information to the attendant concerning a particular functioning of the system. For example, after a credit card has been slid through card reader slot 35, an annunciator 47 is actuable upon determination of the credit authorization status of the particular card read, signaling the attendant to either accept or reject the purchase for credit. Another annunciator, for example, may be used to indicate low inventory levels of fuel at the station.

Figure 3:
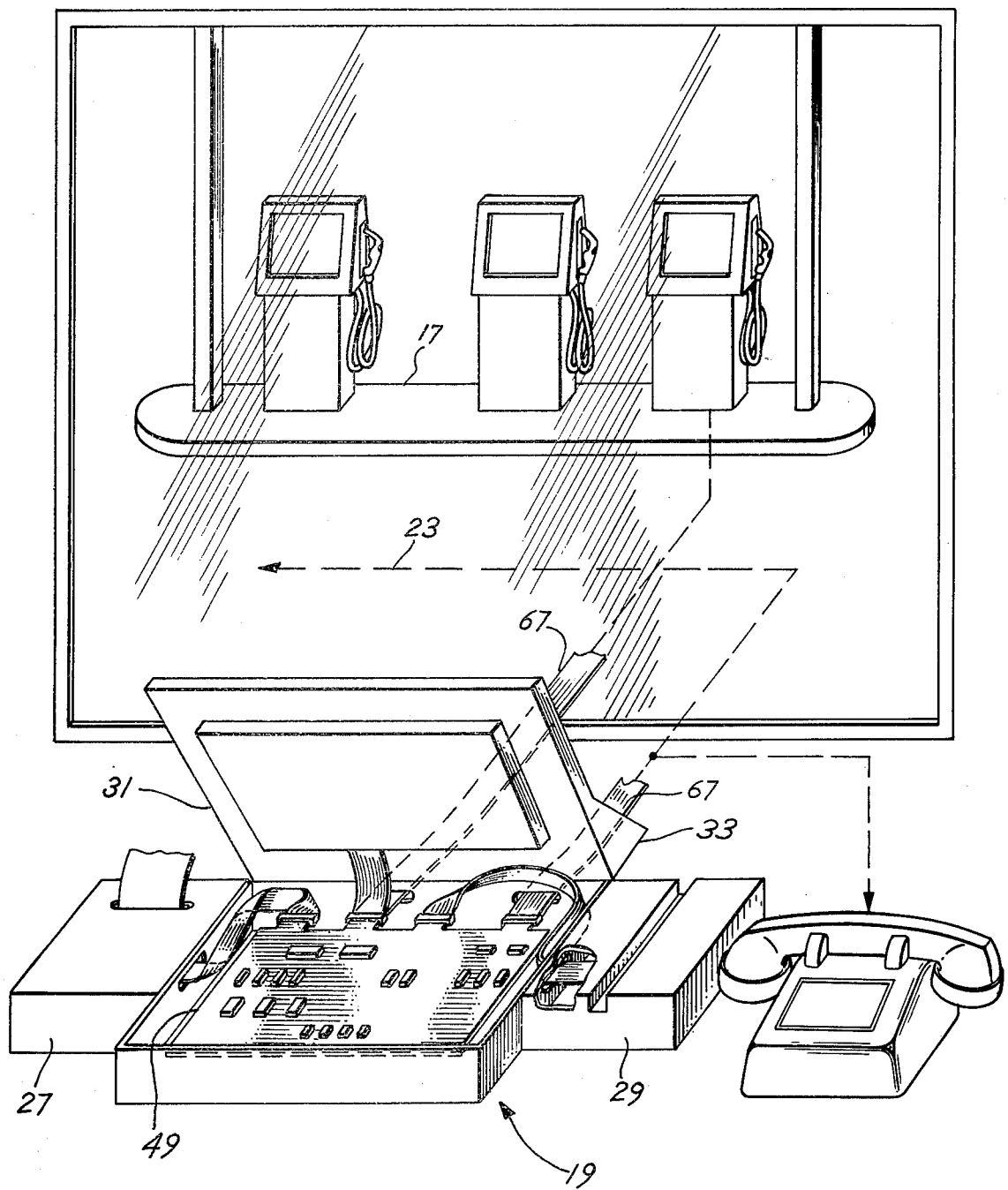
FIG. 3 illustrates a conventional microcomputer forming the process and control system of the terminal of FIG. 3.

Referring to FIG. 3, a conventional microcomputer 49 controls the overall system processing and management of console 19. The microcomputer performs a number of tasks which may be summarized as follows:

(1) data is retrieved from the dispensing pumps in the form of a measure of the value amount of the gasoline dispensed and is manipulated by microcomputer 49 to enable printing of gasoline sale information by printer 27;

(2) sales data is received from keyboard 31 and is manipulated to provide output commands to printer 27 for printing of the keyed-in sales information; control data entered from keyboard 31 instructs the operation of microcomputer 49, as for example, instructing the microcomputer to provide a receipt print-out; and (3) data is received from card reader 29 of the information read from the customer's credit card and is manipulated to provide output commands along cable 23 for enabling transmission of the credit card information to a data bank for establishing credit authorization.

One suitable microcomputer 49 is a Z80. Microcomputer system, Software Development Board SDB-80, manufactured by Mostek Corporation, Carrollton, Texas. Reference is made to Mostek's MK3880 Central Processing Unit Technical Manual, February, 1977, Mostek's MK3881 Parallel I/O Controller Technical Manual, November, 1976 and Mostek's SDB-80 Software Development board Operations Manual, May, 1977, which are incorporated herein by reference. Specifically, the SDB Operations Manual explains the considerations involved in interfacing peripheral devices to the Z80 microcomputer.

As shown in FIG. 3, microcomputer 49 treats printer 27, card reader 29, keyboard 31, display device 33 and the dispensing islands (island 17 shown in FIG. 3) as peripheral devices which are interconnected by means of bus cables 67. The microcomputer is also connected to cable 23 for communication with the data bank.

Microcomputer 49 is interconnected to the dispensing islands for monitoring the sale of gasoline dispensed from each pump. The final totals for each pump are transmitted to the microcomputer at the completion of fuel dispensing when commanded by the attendant's actuation of the dispenser control keypad 45. The dispensing islands may also receive commands from microcomputer 49 for enabling and disabling selected pumps. The pump sales data may be encoded in a number of ways, preferably, the value amount rather than the gallonage is encoded in the pump data, with the gallonage computable separately by the microcomputer from a known unit price per gallon.

As illustrated in the above-cited Wostl patent (See FIGS. 9–12), fuel pump controls are located on the outside of the pump for actuation by the customer. After a customer completes dispensing a desired quantity of fuel, a handle located on the side of the pump is rotated by the customer to stop the gasoline tally permitting the pump to be replaced in its holder. The rotation of the pump handle can be utilized to place the pump's final sales data in a ready state for retrieval by the microcomputer when desired. The pump may automatically lock at this time until reset by the microcomputer.

Dispenser control keypad 45 of the keyboard 31 is utilized to permit the attendant to instruct the microcomputer to retrieve pump sales data from a selected pump and to thereafter enable the selected pump for use by the next customer. The attendant actuates keypad 45 just prior to actuation of the PRINT key of keypad 41 to provide the appropriate gas sales information of a selected pump required by the printer. This is an important feature of the embodiment, which permits an attendant to quickly select a particular pump scale to be printed by the printer without the attendant having to view the pump or transcribe any pump sale information.

To permit a gasoline pre-payment mode of terminal operation to be performed, in which a customer may pre-purchase a quantity, for example $5.00 of gasoline, the microcomputer may effectively monitor the immediate pump sales total and disable the particular pump upon its reaching the $5.00 dispensed sale.

One preferred embodiment of the present invention is structured around microcomputer 49 which is a conventional 8-bit, parallel bus microprocessor having an accumulator, a plurality of registers and an instruction register and CPU Control for interpretation and execution of micro-level assembly language instructions.

Microcomputer 49 manages the acquisition of dispensing sales data from gasoline pumps and other sales information data entered through keyboard 31, processes the data and prints the sales information in receipt form via printer 27. The system is managed under the control of keyboard 31 permitting the attendant to initiate particular operations to be performed by microcomputer 49. The accumulation of sales data information is conducted in a program sequence manner in order to print a final receipt upon request. As the attendant pushes the PRINT button on keyboard 31, microcomputer 49 produces a receipt print-out according to information it has accumulated and processed. Until the attendant pushes the PRINT button, the microcomputer continues to accumulate sales data.

Figure 4:
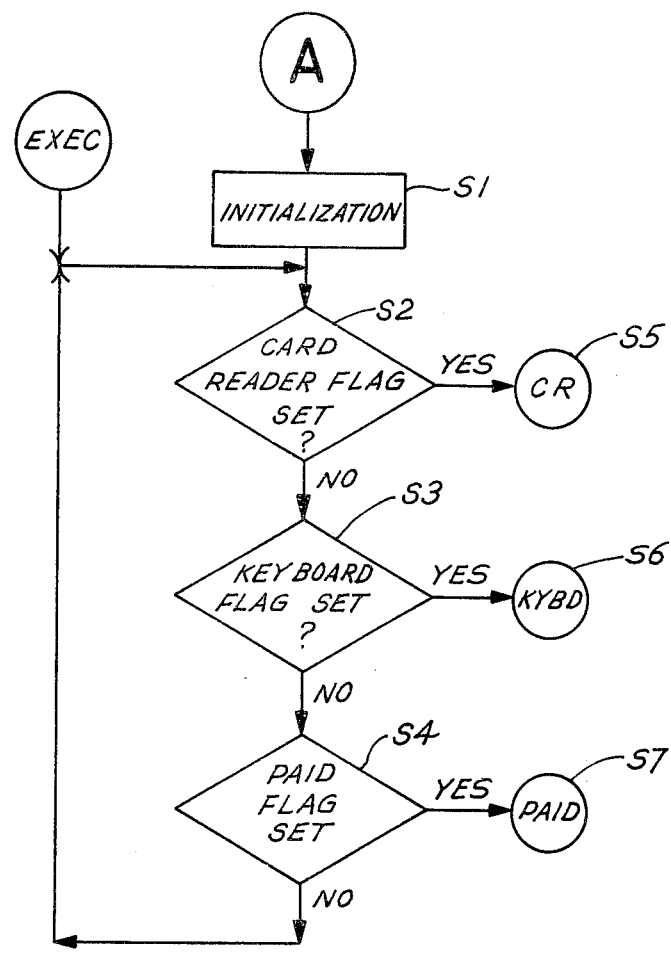
FIG. 4 is a flowchart illustrating the basic executive control sequence executed by the microcomputer of FIG. 3.

In order to obtain the data required for print-out of both gasoline and other sale information, the microcomputer steps through a basic executive control sequence schematically shown in the flowchart of FIG. 4. The executive sequence embodies a basic set of subroutines used to read entries from keyboard 31, card reader 29 and from the dispensing pumps 20a–c.

The encircled A in FIG. 4 indicates the initial entry point into the executive control sequence. At step S1, the system is initialized and microcomputer 49 begins to step through successive steps S2–S4 for evaluating the status of 3 different flags. Whenever one of the three flags is set, control is transferred to a specific subroutine for producing a predetermined function.

At step S2, a CARD READER flag is checked for passing control via step S5 to a subroutine which reads credit card data being sent from card reader 29. At step S3, a KEYBOARD flag is checked for determining whether keyboard data is available for entry from keyboard 31; control is responsively passed at step S6 to a keyboard subroutine. The status of a PAID flag is checked at step S4, indicating whether the attendant is requesting sales data of a particular pump to be retrived. When the PAID flag is set control is passed at step S7 to a gas sale retrieval subroutine.

Each of the 3 executive control flags are effectively set by the card reader or keyboard requesting an interrupt from microcomputer 49. The interrupt request will be honored by the microcomputer at the completion of the current instruction being executed, by passing control to a peripheral service routine illustrated by FIG. 5A.

Referring to FIG. 5A, the encircled B indicates the initial entry point into the peripheral service routine. Microcomputer 49 initially determines which of the peripherals is demanding interrupt. The interrupting peripheral is determined at steps S10–S12 for responsively setting one of the 3 executive control flags at steps S13–S15. After the flag has been set, the interrupting peripheral is notified in a handshake manner and control is returned to the executive control sequence of FIG. 4, steps S16, S17.

Whenever a substantially simultaneous interrupt is occurring (as for example where both a key from keypad 45 and a key from keypad 41 are depressed) the peripheral service routine determines the simultaneous demand for interrupt, step S18, and a reenter annunciator 47 is actuated, step S19, for signaling the operator to re-perform his previous actions in a successive manner.

FIG. 6 illustrates the flow of the credit card routine which is entered from the executive control sequence whenever the CARD READER flag is set. At step S20 microcomputer 49 retrieves the credit card data from card reader 29. The microcomputer performs a check at step S21 and S22 to determine whether the entire card data has been retrieved. If the card information is incomplete, microcomputer 49 initiates a "Re-Enter" annunciator 47 on the display device 33 for signalling the attendant to re-enter the credit card through card reader 29. (step S23).

Where the entire data from the credit card has been received, control is passed for transmission of the credit card data to the data bank, step S24. After data transmission, the card reader flag is reset, step S25, and return is made at step S26 to the executive control for awaiting data return from the data bank.

The data bank is stored with credit card validation data from which the validity of accounts can be determined. By way of example, if the data bank is a centralized data bank serving a plurality of service 11 from a remote location, then the data bank may store each account number together with an indication of whether the account is valid or invalid. The data bank functions by returning to the microcomputer a credit card validation data word indicative of the credit card validity state.

Referring to FIG. 5B, an interrupt request S27 from the data bank will cause microcomputer 49 to jump to a communication sequence beginning at step S28 as shown in FIG. 6. Microcomputer 49 reads the data transmitted from the data bank and determines whether or not credit has been authorized (steps S28–S29). If credit has not been authorized microcomputer 49 actuates a "DENY" annunciator 47 of the display device 33, step S30. If credit is authorized, an "AUTHORIZED" annunciator 47 is actuated, step S31. The credit card information is then stored at step S32 and a "CARD OK" is set at step S33 before control is returned to the executive control program via step S34.

The "CARD OK" flags tells the microcomputer whether credit is authorized. If credit is not authorized, the printing of a receipt is automatically inhibited when the attendant presses the PRINT button. The attendant must then use the CASH key to transact the sale. Because the terminal maintains a record of the CASH dollars accumulated by the attendant, attendant fraud is avoided.

Figure 7:
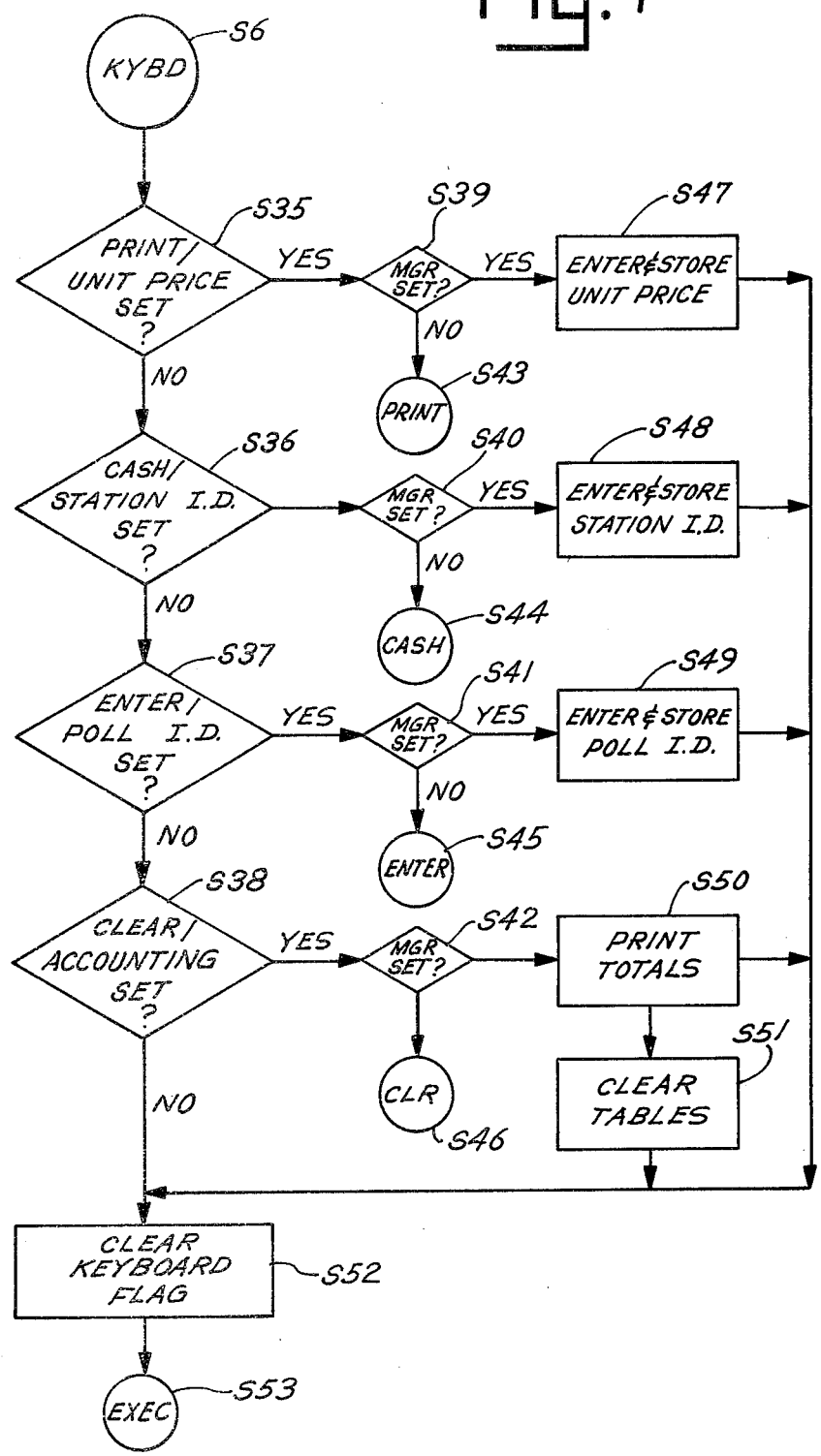
FIG. 7 is a flowchart of keyboard data acquisition and response sequence executed by the microcomputer of FIG. 3.

FIG. 7 illustrates the flow of the keyboard routine entered from the executive control sequence whenever the keyboard flag is set. The keyboard subroutine initially determines which of the several keys of keyboard 31 has been actuated and then where required jumps to an appropriate routine for handling the operation commanded.

Figure 8:
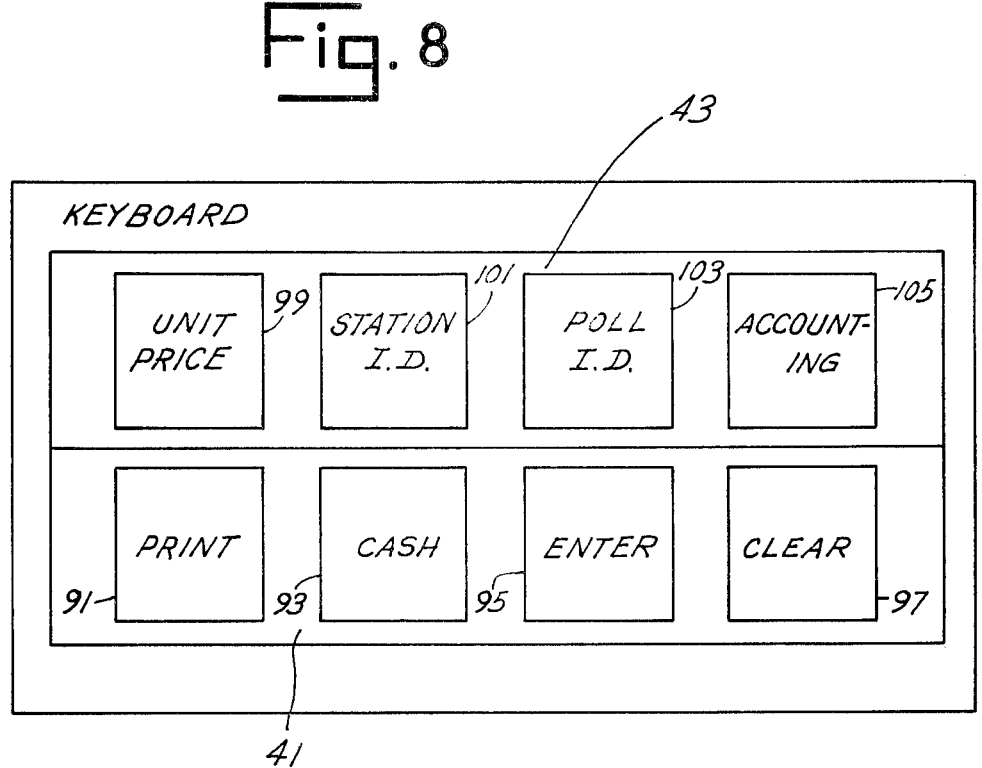
FIG. 8 is a top view of a portion of a keyboard embodiment of the terminal of FIG. 2.

The functional keys of keypad 41 of FIG. 2 are illustrated in FIG. 8 by keys 91–97, and are those keys which are used more often and therefore are given separate key status for direct and simple entry of instruction by the attendant to microcomputer 49. Keypad 43 of FIG. 3, may also be given separate key status as indicated by the keys 99–105 in FIG. 8. In an added embodiment, the functional commands associated with keys 91–105 may, in the alternative, be entered by coded data using numeric keypad 37 followed by actuation of the ENTER key, as described hereinafter.

The keyboard routine of FIG. 7 monitors the direct entry keys of FIG. 8. A print key 91, a cash key 93, an enter key 95 and a clear key 97 are functional keys which when actuated by the attendant cause microcomputer 49 to produce a programmed function. A unit price key 99, a station ID key 101 and a poll ID key 103 are data entry keys which when actuated in conjunction with numeric keypad 37 enter data to microcomputer 49 for providing information to be printed by printer 27 and/or information to be transferred to the data bank. An accounting key 105 is actuable for commanding microcomputer 49 to print out specific tables of information which have been kept and updated by the microcomputer during system operation.

Referring to FIG. 7, steps S35–S42 make a determination as to whether one of the keys of functional keypad 41 has been actuated by the attendant, for responsively jumping to a print, cash, enter or clear subroutine at respective steps S43–S46. Where one of the data entry keys 99–103 has been actuated, control is passed to steps S47–S49 for entry and storage of the data. Actuation of accounting key 105 commands a print-out of predetermined totals which have been accumulated by the processor during its operation, after which the accounting totals are cleared, step S50, S51. After processing of a key actuation by the routine of FIG. 7, the keyboard flag is cleared and control is returned to the executive control sequence, steps S52–S53.

The unit price, station I.D. and POLL I.D. data which are entered, are stored at an appropriate location for use by the microcomputer during printing and/or on-line communication with the data bank. The unit price data may contain two or more different unit prices for each grade of gasoline sold for permitting a multi-tier price structuring on either a full-service/self-service basis and/or a cash-credit basis. Where, for example, a gasoline sale is transferred from a self-service pump, the stored unit price may be used to calculate the number of gallons dispensed. Also, a discount may be given for cash purchases by using the stored unit price to compute the final sale amount to be sent to the printer.

Figure 9:
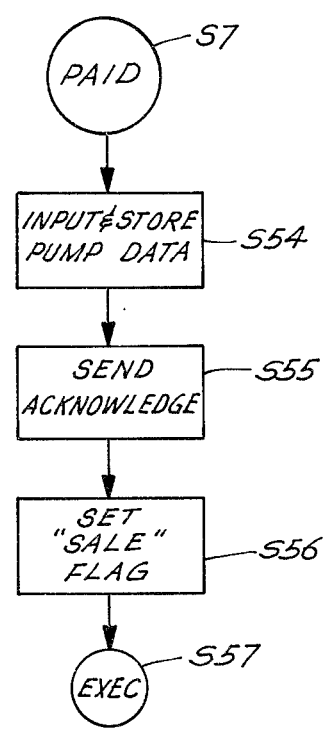
FIG. 9 is a flowchart of gasoline sales data acquisition executed by the microcomputer of FIG. 3.

Referring to FIG. 9, a PAID subroutine is entered from the executive control sequence whenever the PAID flag is set responsive to the attendant pressing a selected pump button 46. The PAID subroutine inputs the selected pump data and stores the same for use during receipt printing (Step S54). Receipt of the pump data is acknowledged to the dispensing island in a handshake fashion and a sale flag is set, steps S55–S56. Control is then returned to the executive control routine at step S57. With the sales information of the selected pump stored, the print key may be actuated for printing the receipt.

Figure 10:
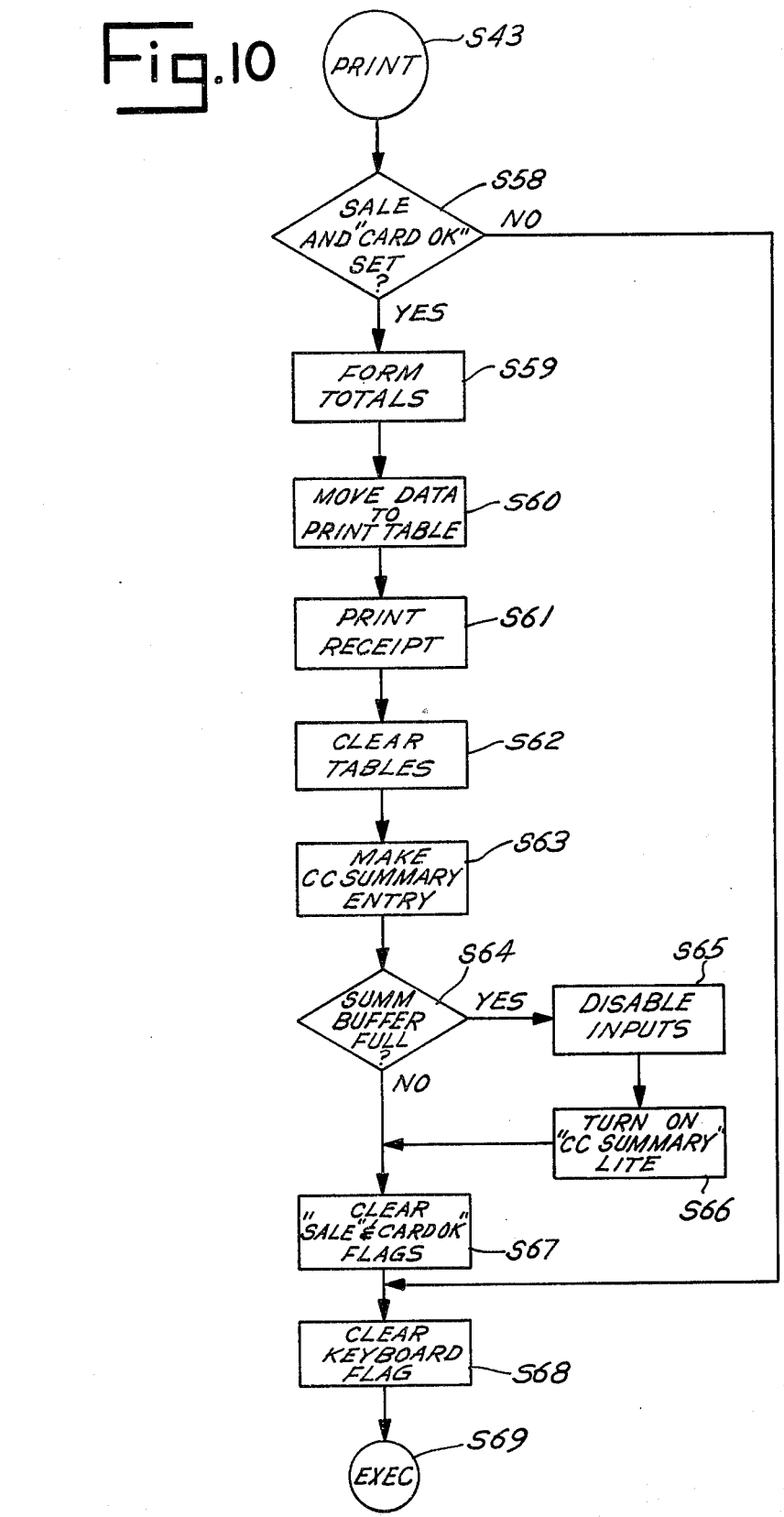

Actuation of the print key transfers the program sequence from the keyboard routine of FIG. 7 to the print routine of FIG. 10. The print routine initially determines whether a sale has occurred for printing by checking the SALe flag; the CARD READER flag is also checked for printing a receipt only if a credit card payment is authorized (step S58). Where a print-out is to occur, steps S59–S61 are executed for printing the receipt. The microcomputer computes a sale total of miscellaneous sale items with the gasoline sale of the selected pump. All data to be printed is moved to a print table from which proper receipt format is constructed. The receipt is thereafter printed by the microcomputer 49 successively transferring print commands and data information from the print table to the printer 27. The print tables are thereafter cleared at step S62, and a credit card summary of the transaction is stored in memory at step S63.

A credit card summary of the printed transaction is stored in a predetermined memory location and includes the account number of the credit card billed, plus the sales amount of gasoline and miscellaneous items purchased. This credit card summary can be retreived from storage by microcomputer 49 for independant print-out to provide a credit voucher to purchase bulk gasoline, as explained above.

After the credit card summary has been stored, a test is performed at step S64 for determining whether the summary memory location is full. If the summary memory location is full, all inputs to microcomputer 49 are disabled and a credit card summary annunciator 47 of the visual display device 33 is actuated to indicate to the attendant that a credit card summary print-out must be actuated, step S65, S66. If the summary memory location is determined not to be full, the SALE and CARD OK flags are reset, the keyboard flag is reset and return is made to the executive control sequence, steps S67–S69.

Figure 11:
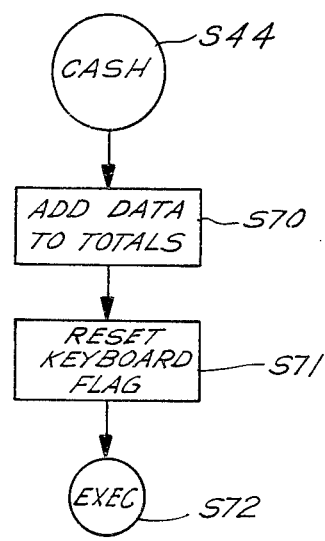

Actuation of the CASH key on the keyboard transfers the program sequence from the keyboard routine of FIG. 7 to the CASH routine of FIG. 11, where data of the present cash sale is accumulated in order to update accounting tables, step S70. Thereafter, the keyboard flag is reset and control is returned to the executive control sequence via steps S71, S72.

Certain accounting information is accumulated during operation of the microcomputer by programming the microcomputer to store predetermined information into memory. For example, gasoline sales totals can be accumulated in dollars and gallons and can be accumulated for the entire station sales, for a specific product, for a type of service, i.e. full or self-serve, for a method of payment, i.e., cash or credit, or for storage tank inventory. The storing of such information can be accomplished during receipt print-out in the print routine of FIG. 10.

Actuation of the ENTER key on the keyboard transfers the program sequence from the keyboard routine of FIG. 7 to an ENTER routine of FIG. 12. Pressing of the ENTER key will enter specific commands to microcomputer 49. These commands may be orderly stored in a buffer memory associated with the keyboard by actuation of the numeric keypad 37. The microcomputer inputs the data stored in the buffer memory of the keyboard, step S73, deciphering at steps S74–S78 the instructional command dictated by the buffer memory data.

If a credit card code including a credit card number has been entered into the keyboard 31, the microcomputer deciphers the code at step S74 and jumps at step S79 to the credit card routine of FIG. 6 for proper verification of the credit card number to retrieve credit authorization. If data code instruction has been entered, the microcomputer is instructed to store a new date in the print tables (step S75, S80). At step S76, microcomputer 49 determines whether a particular type of miscellaneous sale has been made in which appropriate sale information and required alphanumeric character spelling of the type of sale, is required to be printed onto the receipt. The specific print code in conjunction with its sale information is stored at step S81 and the sale is set for indicating a sale has occured, step S82.

Certain accounting information can be accumulated during operation of the microcomputer by programming the microcomputer to store predetermined information. Where an accounting print-out request of such totals is deciphered at step S77, microcomputer 49 prints the saved totals at step S83 by transferring the requested information saved to the printer for appropriate print-out. The requested total tables are then cleared at step S84.

The credit card summary buffer can be printed out independently of other accounting totals saved. The microcomputer senses that a credit card summary print-out instruction has been received at step S78, and appropriately prints a summary of the information stored in the credit card buffer at step S85; after which the summary buffer is cleared at step S86.

Figure 13:
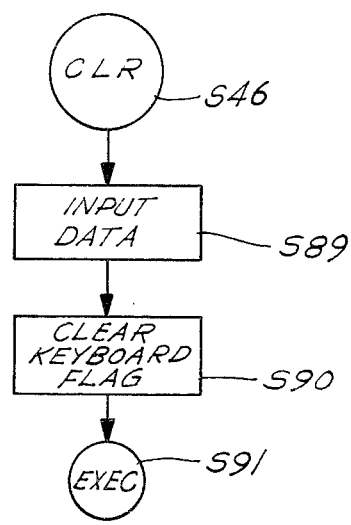

After the specific code instruction from keyboard 31 has been interpreted and performed by microcomputer 49, the keyboard flag is reset and return is made to the executive control sequence at step S87, S88. Actuation of the CLEAR key 97 on the keyboard transfers the program sequence from the keyboard routine of FIG. 7 to a CLEAR routine of FIG. 13. Data is cleared at step S89 from the buffer memory of the keyboard and the keyboard flag is cleared at step S90. Return is then made to the executive control sequence at step S91.

It should be understood, of course, that the foregoing disclosure relates to preferred embodiments of the invention and that other modifications or alterations may be made therein without departing from the spirit or scope of the invention as set forth in the appended claims.

The embodiments of the invention in which an exclusive property or privilege is claimed are defined as follows:

1. An attendant-controlled system for automatic enablement and monitoring of fuel dispensers and transacting sales comprising:
   at least one manually operable fuel dispensing means for dispersement of fuel, each said fuel dispensing means including means for generating first coded data signals representative of the value of fuel dispensed;
   credit card reader means operable for identifying indicia carried by a credit card and for generating second coded data signals indicative of said indicia;
   attendant-operable keyboard means including:
   (i) sale input means for generating third coded data signals representative of the value of at least one non-fuel sale keyed-in by the attendant;
   (ii) print key means manually actuable for generating a print signal for commanding a receipt printout of said value of fuel dispensed and/or said non-fuel sale; and
   (iii) cash key means manually actuable for generating a cash signal for permitting a non-credit card sale;
   receipt printer means for printing alphabetic and/or numeric information;
   data transmission means connectable to a data bank capable of transmitting data signals thereto and capable of receiving fourth coded data signals from the data bank representative of credit authorization, said fourth coded data signals having a valid credit state or a non-valid credit state; and
   processor control means interconnected to said fuel dispensing means, said credit reader means, said keyboard means, said receipt printer means and said data transmission means, said processor control means responsive to said second coded data signals for instructing said transmission means to transmit said second coded data signals to said data bank, and responsive to said print signal and a valid credit state of said fourth data signals for transmitting said first coded data signals and/or said third coded data signals to said printer means for instructing said printer means to print a receipt indicative of said value of dispensed fuel and/or said non-fuel sale, said processor control means responsive to a non-valid credit state of said fourth coded data signals for inhibiting said printing of said receipt responsive to said print signal, and said processor control means responsive to said cash signal despite a non-valid credit state of said fourth coded data signals for processing said first and said third coded data signals.

2. Apparatus according to claim 1 which includes a plurality of said manually operable fuel dispensing systems.

3. Apparatus according to claim 1, wherein said processor control means is responsive to said cash signal for accumulating said first and said third data signals in preparation of print-out.

4. Apparatus according to claim 2 further comprising first key means operable for instructing said processor control means to retrieve said first coded data signals of a selected fuel dispensing means.

5. Apparatus according to claim 1 wherein said processor control means is responsive to said print signal for computing fifth coded data signals representative of a sales total of said value of dispensed fuel and said value of said non-fuel sale and for transmitting said fifth coded data signals to said printer means for printing the sales total.

6. Apparatus according to claim 5 wherein said processor control means is responsive to said second data signals for storing at least a portion of said second data signals and is responsive to the operation of said print signal for storing said fifth data signals in association with its corresponding second data signals; and wherein said keyboard means includes key means manually selectable for instructing said processor control means to transmit all said stored second data signals and their associated fifth data signals to said printer means for printing each said portion of said indicia and respective sales totals.

7. Apparatus according to claim 6 wherein said processor control means is responsive to said means for computing sixth coded data signals representative of a credit sale total of all said stored fifth data signals and for transmitting said sixth coded data signals to said printer means for printing the credit sales total in conjunction with said printing of each said portion of said indicia and representative sales totals.

8. Apparatus according to claim 1 wherein said processor control means accumulates said first coded data signals for producing seventh coded data signals representative of an accounting total of the value of total fuel over a period of time; and wherein said keyboard means includes manually selectable means for instructing said processor control means to transmit said seventh coded data signals to said printer means for printing said value of total fuel dispensed.

9. Apparatus according to claim 2 wherein said processor control means accumulates first coded data signals according to a particular type of fuel dispensed for producing fuel type data signals representative of an accounting total of the value of total fuel of the particular type of fuel dispensed over a period of time; and wherein said manually selectable means includes means for instructing said processor control means to transmit said fuel type data signals to said printer means for printing said value of total fuel of the particular type of fuel dispensed.

10. Apparatus according to claim 1 wherein said printer means includes means for receiving a preformed, preprinted credit invoice from insertable within said printer means for printing onto the form.

11. Apparatus according to claim 10, wherein said printer means includes means for printing OCR characters at a well-defined location on the form.

12. Apparatus according to claim 1, wherein said keyboard means includes a display device for visually indicating said non-fuel sale amounts as keyed-in by the attendant.

13. Apparatus according to claim 1 and further including annunciator means operable responsive to a command signal, for communicating with the attendant, and wherein said processor control means is connected to said annunciator means and produces a said command signal for operating said annunciator means.

14. Apparatus according to claim 13 wherein said processor control means produces a said command signal responsive to said fourth coded data signals.

15. Apparatus according to claim 1 wherein said processor means computes volume data signals representative of the volume of fuel dispensed responsive to said first coded data signals, and transmits said volume data signals to said printer means in conjunction with said first and said third coded data signals.

16. An attendant-controlled system for automatic enablement and monitoring of fuel dispensers and transacting credit card sales comprising:
- a plurality of manually operable fuel dispensing means for dispensement of fuel by a customer, each said fuel dispensing means including means for generating first coded data signals representative of the quantity of fuel dispensed;
- credit card reader operable for identifying indicia carried by a credit card and for generating second coded data signals indicative of said indicia;
- attendant-operable keyboard means including:
  - (i) sale input means for generating third coded signals representative of the amount of at least one non-fuel sale keyed-in by the attendant;
  - (ii) print key means manually selectable for generating a print signal for commanding a receipt print-out including the value of fuel dispensed and/or said non-fuel sale; and
  - (iii) fuel key means for commanding retrieval of said first coded data signals of a selected one of said plurality of fuel dispensing means;
- receipt printer means for printing at least numeric information responsive to print data input signals;
- data transmission means connectable to a data bank for transmitting data signals thereto and for receiving fourth coded data signals from the data bank representative of credit authorization, said fourth coded data signals having a valid credit state or a non-valid credit state; and
- processor control means interconnected to said fuel dispensing means, said credit card reader means, said keyboard means, said receipt printer means and said data transmission means, said processor control means responsive to said second coded data signals for communicating via said transmission means to said data bank for retrieving said fourth coded data signals, and responsive to actuation of said fuel key means for retrieving said first coded data signals, and responsive to said print signal and a valid credit state of said fourth data signals for formulating print data input signals from said first coded data signals of the selected dispensing means and from said third coded data signals, and for transmitting said print data input signals to said printer means for instructing said printer means to print a receipt indicative of the value of dispensed fuel and said non-fuel sale.

17. Apparatus according to claim 16 wherein said keyboard means includes means for entering unit price data to said processor control means, and wherein said processor control means stores said unit price data when entered from said keyboard means and said processor control means utilizes said unit price data for formulating print data input signals.

18. Apparatus according to claim 17 wherein said entered price data includes a plurality of unit prices for each type of fuel dispensable by said fuel dispensing means, and wherein said processor control means selects one of said unit prices in formulating said print data input signals.

19. The apparatus according to claim 1 wherein said processor control means accumulates third coded data signals for producing non-fuel type data signals representative of an accounting total of the value of total non-fuel items sold over a period of time; and wherein said manually selective means includes means for instructing said processor control means to transmit said non-fuel type data signals to said printer means for printing said value of total non-fuel items sold.

20. The apparatus according to claim 9 wherein said processor control means further comprises inventory control means capable of monitoring said fuel type data signals and bulk purchases of fuel of a particular type to determine the amount of fuel of a particular type available to be dispensed at any point in time; and further comprising second annunciator means connected to said processor control means to alert said attendant of a condition wherein the amount of fuel of a particular type available to be dispensed is below a predetermined operating minimum.

* * * * *

UNITED STATES PATENT AND TRADEMARK OFFICE
CERTIFICATE OF CORRECTION

PATENT NO. : 4,199,100

DATED : April 22, 1980

INVENTOR(S) : Wolfgang J. Wostl, Jack S. Segal, Thomas L. Roach and Robert A. Moore It is certified that error appears in the above-identified patent and that said Letters Patent are hereby corrected as shown below:

Column 12, line 27, before the word "over" insert the word -- dispensed --.

Column 13, line 9, after the word "reader" insert the word -- means --.

Signed and Sealed this

Fifteenth Day of July 1980

[SEAL]

Attest:

SIDNEY A. DIAMOND

Attesting Officer

Commissioner of Patents and Trademarks